United States Patent [19]

Masaki et al.

[11] Patent Number: 4,492,847
[45] Date of Patent: Jan. 8, 1985

[54] MANIPULATOR WELDING APPARATUS WITH SENSING ARRANGEMENTS FOR WELD SLAM TRACKING

[75] Inventors: Ichiro Masaki, Utica, Mich.; Burt H. Shulman, Salt Point, N.Y.; Robert R. Gorman, Newtown, Conn.

[73] Assignee: Unimation, Inc., Danbury, Conn.

[21] Appl. No.: 307,174

[22] Filed: Sep. 30, 1981

[51] Int. Cl.³ .............................................. B23K 9/12
[52] U.S. Cl. ............................ 219/124.34; 358/101; 901/9; 901/42
[58] Field of Search ........... 219/125.1, 124.34, 124.22; 358/100, 101, 107, 901; 414/1; 318/568; 901/19, 42

[56] References Cited

U.S. PATENT DOCUMENTS

| | | | |
|---|---|---|---|
| 3,532,807 | 10/1970 | Webb | 219/124.34 |
| 4,255,762 | 3/1981 | Takeyasu et al. | 358/100 |
| 4,380,696 | 4/1983 | Masaki | 219/124.34 |

FOREIGN PATENT DOCUMENTS

| | | | |
|---|---|---|---|
| 52-56043 | 5/1977 | Japan | 219/124.34 |
| 56-26676 | 3/1981 | Japan | 219/124.34 |

*Primary Examiner*—Clifford C. Shaw
*Attorney, Agent, or Firm*—Mason, Kolehmainen, Rathburn & Wyss

[57] ABSTRACT

Manipulator apparatus with weld seam tracking capabilities is provided with a sensing hand attached to the manipulator arm. The manipulator apparatus traverses a taught welding path on a workpiece to determine any deviation between the workpiece path and the taught path. The sensing hand includes a projection unit for projecting an optical slit pattern onto the workpiece. The sensing hand also includes a path sensing unit including an objective lens and a fiber optic cable for receiving by reflection from the workpiece the projected optical slit pattern. The fiber optic cable is connected to a camera located remotely from the sensing hand. The image received by the camera is utilized by the manipulator apparatus to determine the deviation between the path traversed by the manipulator during sensing and the sensed workpiece path. The deviation is then utilized to calculate the workpiece path data. The calculated path data is then utilized by the manipulator apparatus to weld the desired weld seam with a welding hand attached to the manipulator arm. In a first arrangement, a welding hand and sensing hand are provided at a hand holder station at the work station adjacent the workpiece. The manipulator automatically and selectively exchanges the hands at the hand holder station in accordance with the particular programmed operation to be performed. In another arrangement, the manipulator arm carries a welding hand and a sensing hand. The sensing hand is movably controlled by the manipulator apparatus between an operative sensing position and an inoperative welding position.

6 Claims, 6 Drawing Figures

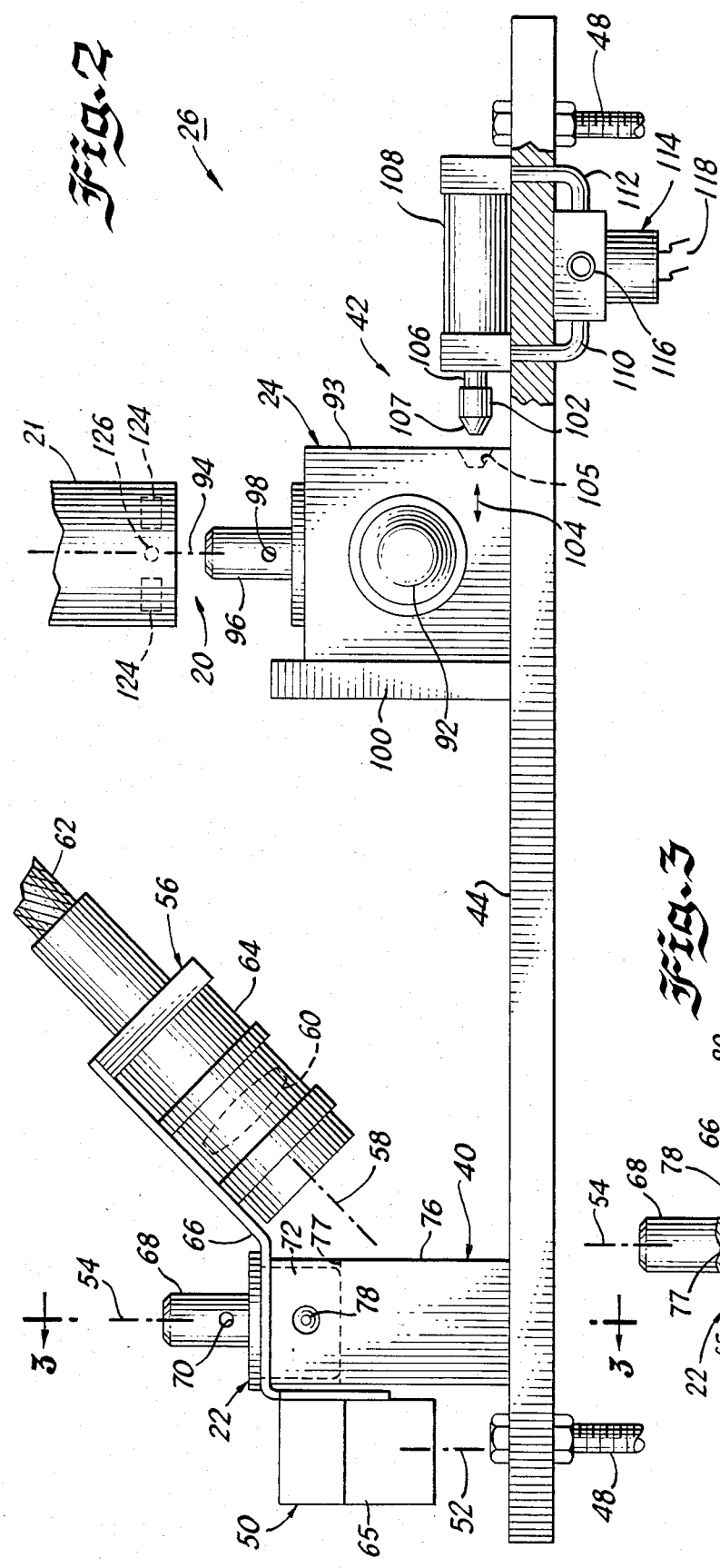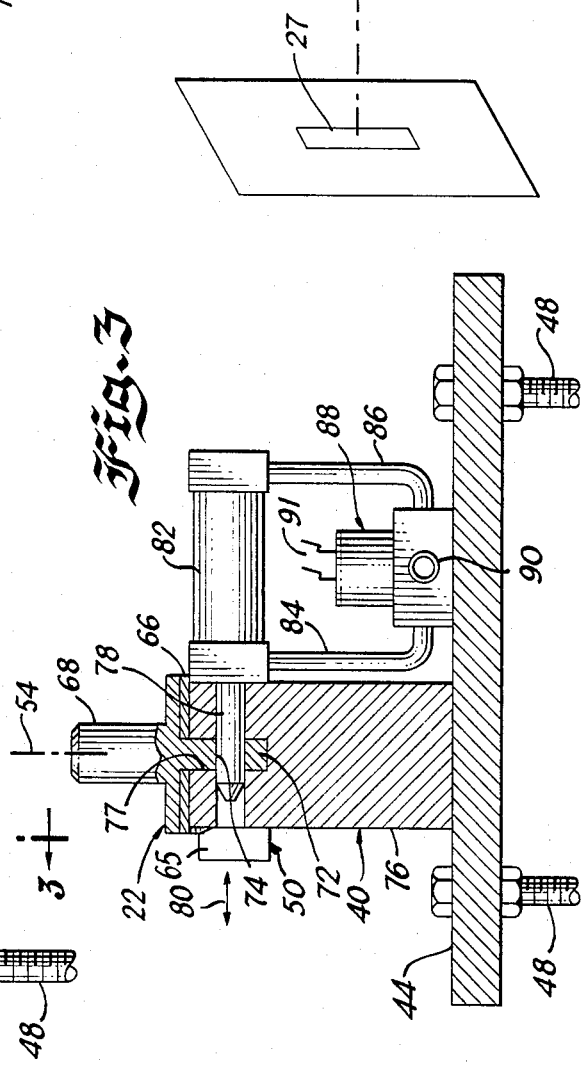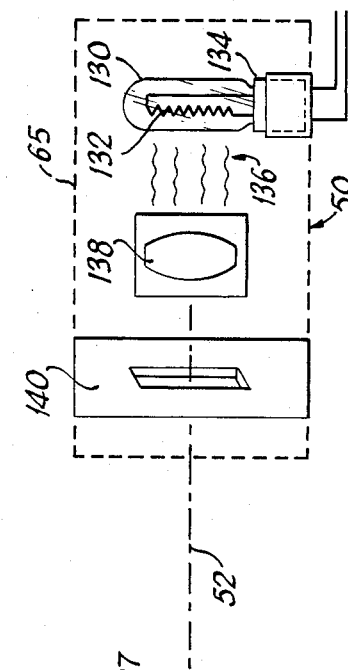

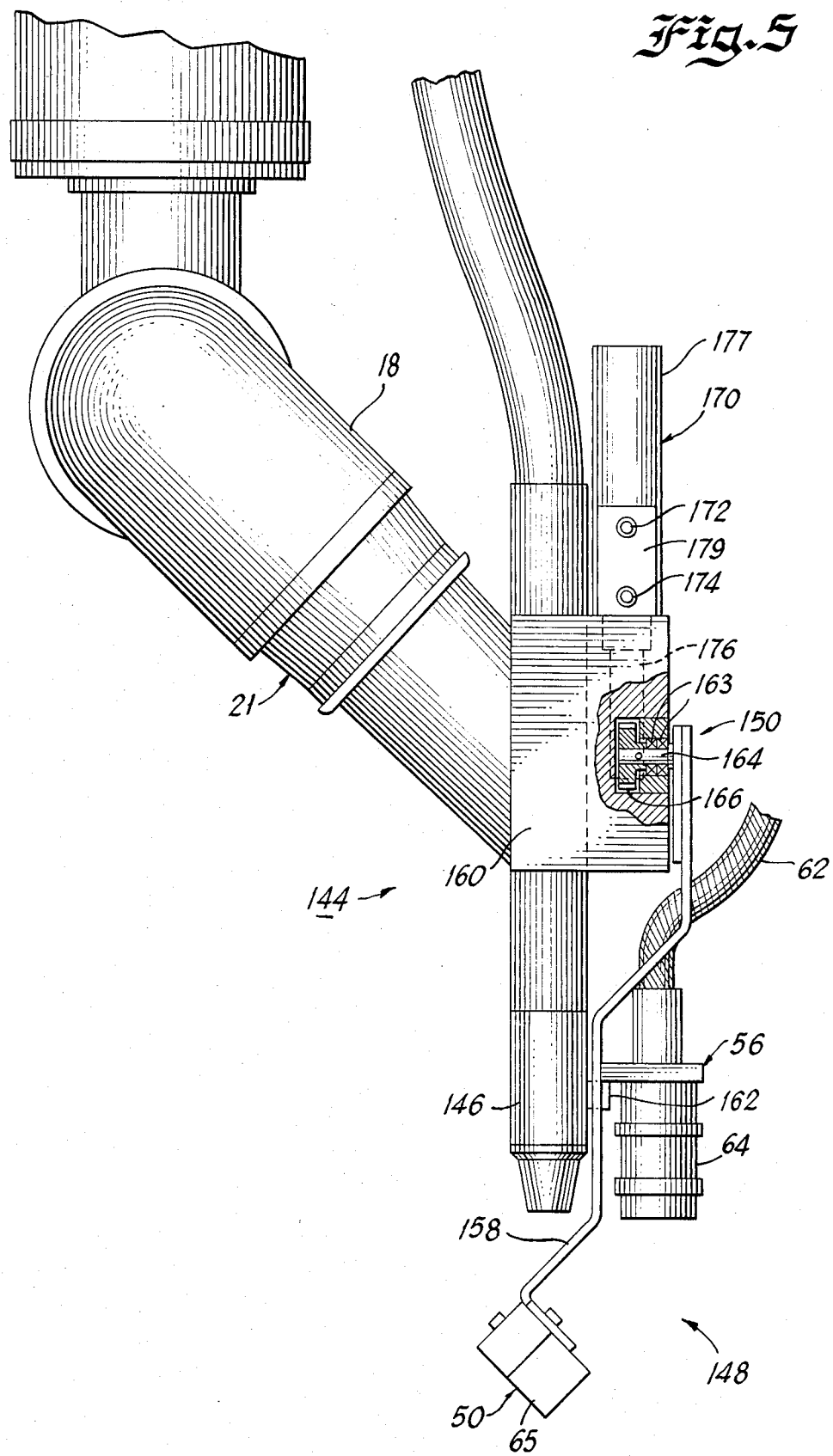

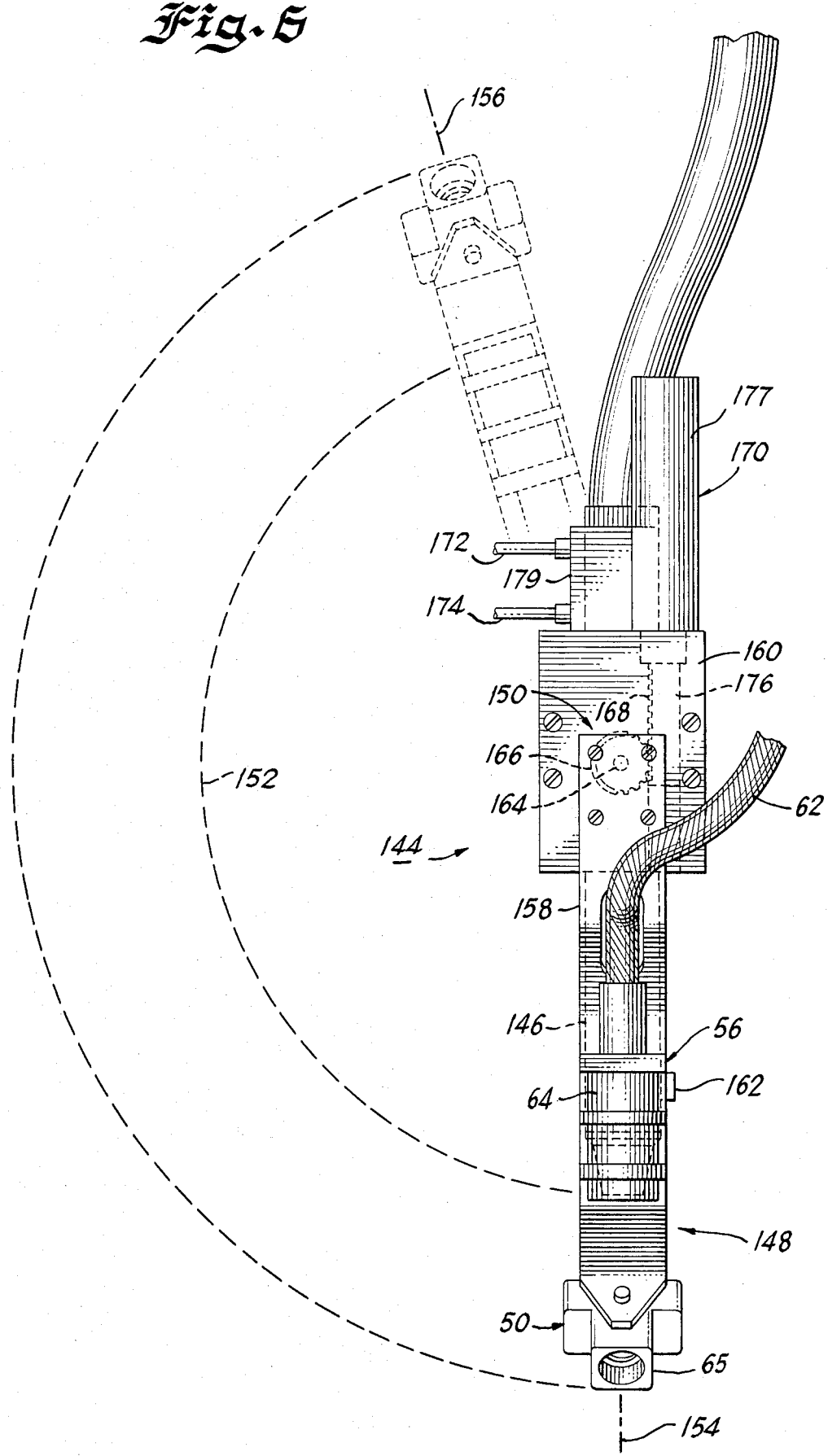

MANIPULATOR WELDING APPARATUS WITH SENSING ARRANGEMENTS FOR WELD SLAM TRACKING

CROSS REFERENCE TO RELATED APPLICATION

This application is directed to improvements in the manipulator welding apparatus disclosed in copending application Ser. No. 206,279 filed by I. Masaki on Nov. 12, 1980, now U.S. Pat. No. 4,380,696, and that application is incorporated herein by reference for all purposes.

BACKGROUND OF THE INVENTION

1. Field of the Invention

The present invention relates generally to manipulator welding apparatus with a vision system for weld seam tracking and more particularly to manipulator apparatus including improved hand arrangements.

2. Description of the Prior Art

Various welding apparatus and vision detection systems have been proposed. For example, copending application Ser. No. 239,621 filed by I. Masaki on Mar. 2, 1980 and U.S. Pat. No. 4,380,696 provide methods and apparatus for detecting the positional deviation of a workpiece from a reference position by means of a visual detection system and an image processor and provides methods and apparatus for performing welding based on corrected work path data. Further, the apparatus of U.S. Pat. No. 4,380,696 provides improve sensing hands and welding hands for accomplishing welding and weld seam tracking.

As disclosed and discussed in U.S. Pat. No. 4,380,696, it is desirable to provide a projection unit, an image detecting camera, and a welding gun on a hand carried by a manipulator arm with the manipulator arm selectively rotating the hand to present either the welding gun or the projection unit and camera to a workpiece. Further, U.S. Pat. No. 4,380,696 also discloses selectively attachable sensing hands and welding hands.

SUMMARY OF THE INVENTION

Accordingly, it is a principal object of the present invention to provide improved sensing and welding hands for manipulator apparatus with workpiece welding path tracking capabilities.

It is a further object of the present invention to provide a compliant hand holder station for manipulator apparatus wherein a sensing hand and a welding hand are automatically and selectively attachable and exhangable by the manipulator apparatus at the hand holder station, the hand holder station including control arrangements for selectively retaining and releasing the respective hands in coordination with the attachment and releasing of the hands by the manipulator apparatus.

It is another object of the present invention to provide a sensing hand for manipulator apparatus that also carries a welding torch, wherein the sensing hand is controllable by the manipulator apparatus between an operative sensing position and an inoperative position without changing the orientation of the welding torch.

It is yet another object of the present invention to provide a sensing hand for manipulator apparatus with a vision system wherein the sensing hand includes a projection unit and an image sensing unit having an objective lens and a fiber optic cable, the fiber optic cable being connected to a camera located remotely from the manipulator arm and the sensing hand.

It is still another object of the present invention to provide a sensing hand for manipulator apparatus for projecting an optical slit pattern that includes a relatively low power light source with the filament of the light source being arranged generally perpendicular to the axis of the projection unit.

These and other objects of the present invention are efficiently achieved for manipulator apparatus with weld seam tracking capabilities by providing a sensing hand attached to the manipulator arm. The manipulator apparatus traverses a taught welding path on a workpiece to determine any deviation between the workpiece path and the actual path of the manipulator during sensing, which can be calculated from the detected encoder values of the joints of the manipulator. The sensing hand includes a projection unit for projecting an optical slit pattern onto the workpiece. The sensing hand also includes a path sensing unit including an objective lens and a fiber optic cable for receiving by reflection from the workpiece the projected optical slit pattern. The fiber optic cable is connected to a camera located remotely from the sensing hand. The image received by the camera is utilized by the manipulator apparatus to determine the deviation between the actual path of the manipulator and the actual workpiece path. The deviation is then utilized to calculate the workpiece path data. The corrected path data is then utilized by the manipulator apparatus to weld the desired weld seam with a welding hand attached to the manipulator arm. In a first arrangement, a welding hand and sensing hand are provided at a hand holder station at the work station adjacent the workpiece. The manipulator automatically and selectively exchanges the hands at the hand holder station in accordance with the particular programmed operation to be performed. In another arrangement, the manipulator arm carries a welding hand and a sensing hand. The sensing hand is movably controlled by the manipulator apparatus between an operative sensing position and an inoperative welding position.

The hand holder station in the first arrangement includes control arrangements controllable by the manipulator apparatus for selectively retaining and releasing the respective hands in coordination with the attachment and releasing of the hands by the manipulator arm. The hand holder station in a preferred arrangement compliantly mounts the hands to provide a degree of movement or compliance to the hands when the manipulator arm is moved to attach the hands retained at the hand holder station.

The invention both as to its organization and method of operation together with further objects and advantages thereof will best be understood by reference to the following specification taken in conjunction with the accompanying drawings.

BRIEF DESCRIPTION OF THE DRAWINGS

FIG. 2 is an elevational view of the sensing hand, the welding hand and the hand holder station of FIG. 1;

FIG. 3 is a sectional view taken along the line 3—3 of FIG. 2 illustrating details of the sensing hand retention arrangement at the hand holder station;

FIG. 4 is a diagrammatic elevational view of a projection unit of the sensing hand of the present invention of FIGS. 1 and 2;

FIG. 5 is an elevational view of portions of the manipulator apparatus of FIG. 1 including another hand arrangement including a welding torch and a rotatable sensing assembly with portions cut away and sectioned for clarity; and FIG. 6 is a side view of the hand arrangement of FIG. 5.

DESCRIPTION OF THE PREFERRED EMBODIMENT

Figure 1:
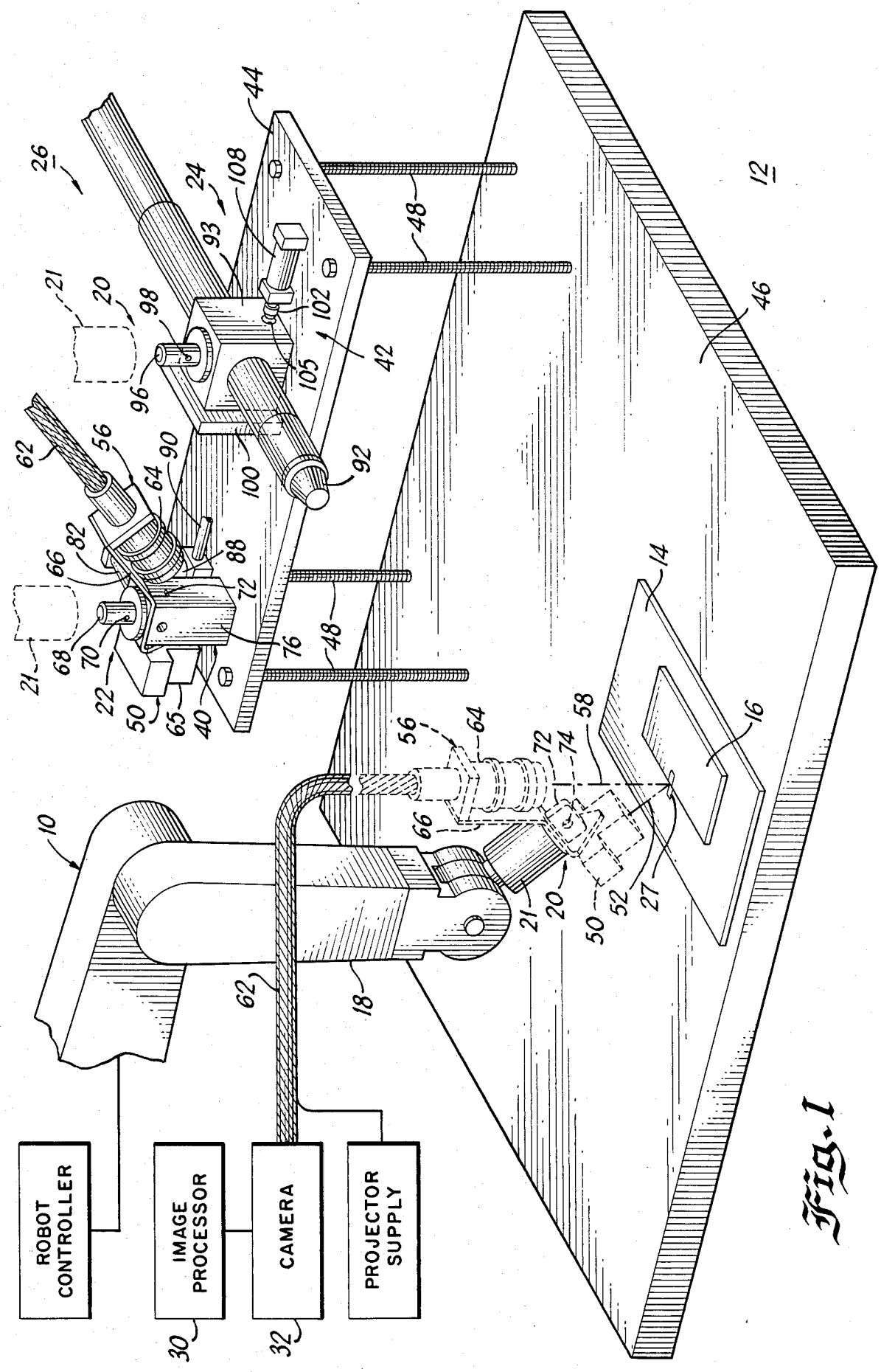
FIG. 1 is a perspective view of manipulator apparatus and a hand holder station adjacent a workpiece at a work station for holding a sensing hand and a welding hand in accordance with the present invention.

Referring now to FIG. 1, manipulator apparatus or robot 10 is illustrated adjacent a work station 12 to accomplish welding on a workpiece such as the lap seam welding of plates 14, 16 in accordance with the principles of the present invention. The manipulator apparatus 10 includes a manipulator arm 18 controllable in a plurality of axes.

The manipulator arm 18 in the embodiment of FIG. 1 at a wrist portion 21 includes a hand receiving socket 20 for selectively attaching a sensing hand 22 or a welding hand 24. The sensing hand 22 and the welding hand 24 are automatically and selectivley attachable to the manipulator arm 18 at a hand holder station generally referred to at 26. The manipulator apparatus 10 automatically and selectively exhanges the hands 22, 24 at the hand holder station 26 in accordance with the particular programmed operation to be performed. The hand holder station 26 includes control arrangements for selectively retaining and releasing the respective hands 22, 24 in coordination with the attachment and releasement of the hands in the hand receiving socket 20 of the manipulator arm 18 as will be discussed in more detail hereinafter.

The operation of the manipulator apparatus 10 to accomplish the welding of the workpiece is described in the aforementioned application Ser. No. 239,621 and U.S. Pat. No. 4,380,696 to which reference may be made for a detailed discussion. Briefly, a desired welding path is taught during a teach operation by moving the manipulator arm 18 with attached welding hand 24 via manipulator teach controls. During the teach operation, positional data signal are recorded representing the taught path. A reference or template image is also recorded.

As successive workpieces are presented to the manipulator for welding in a repeat work cycle mode, the manipulator arm 18 is controlled in a first sensing pass with the attached sensing hand 22 to move over the taught path with images of the welding path being detected at predetermined points along the path. To this end, the sensing hand 22 projects an optical slit pattern 27 across the weld path to be welded and senses by reflection the image of the slit pattern on the workpieces 14, 16 along the weld path.

The manipulator apparatus 10 in accordance with an image processor 30 and a camera 32 utilizes the detected images to determine the deviation between the actual path of the manipulator and the workpiece weld path and further to calculate to provide corrected welding path data.

During a second repeat welding pass with the attached welding hand 24, the manipulator arm 18 is controlled to perform the desired welding along the workpiece welding path in accordance with the corrected welding path data. The first sensing pass and the second welding pass are repeated for each workpiece. The manipulator arm 18 is controlled to move at a relatively higher rate of speed during the first sensing pass and at a relatively lower welding speed during the second welding pass.

Thus, after a previous workpiece has been welded, the manipulator apparatus 10 is programmed to move the welding hand 24 to the hand holder station 26 to position the welding hand 24 in a respective welding hand retaining fixture. The control arrangement at the hand holder staion 26 is then controlled to retain or clamp the welding hand 24 and the manipulator arm 18 is controlled to release the welding hand 24. Next, the manipulator arm moves to the sensing hand position at the hand holder station 26 to grasp or attach the sensing hand 22. The control arrangement at the hand holder station 26 is then controlled to cause the sensing hand retaining fixture to release the sensing hand 22. The manipulator arm 18 moves away from the hand holder station 26 to perform the first sensing pass with respect to the next workpiece.

After the first sensing pass is completed, the manipulator arm returns the sensing hand 22 to a respective sensing hand retaining fixture position at the hand holder station 26. The control arrangement at the hand holder station 26 is then controlled to clamp or retain the sensing hand 22 and the manipulator arm 18 releases the sensing hand.

At this point, the manipulator apparatus 10 is ready to perform the second welding pass. The manipulator arm 18 is moved to grasp or attach the welding hand 24 at the welding hand fixture position of the hand holder station 26. After the welding hand 24 is attached to the manipulator arm 18, the control arrangement at the hand holder station then causes the welding hand retaining fixture to release the welding hand 24. The manipulator arm 18 with attached welding hand 24 then moves to the workpiece to perform the second welding pass.

Referring now additionally to FIG. 2, the hand holder station 26 includes a sensing hand retaining fixture 40 and a welding hand retaining fixture 42 affixed to a fixture reference plate 44. The fixture reference plate 44 is compliantly mounted above the work station plane 46 of the work station 12 by a plurality of compliant mounting devices 48 such as screws or bolts. In one arrangement, approximately four inch long #8 screws are utilized for the devices 48. Thus, the fixture reference plate 44 is compliant in the plane 46.

The sensing hand 22 retained by the sensing hand retaining fixture 40 includes a projection unit 50 arranged on the hand 22 with a projection axis 52 that forms an angle of 45° in a preferred embodiment with the work station reference plane 46 during sensing. As shown in FIG. 2, the projection axis 52 is parallel to a sensing hand axis 54. The sensing hand 22 also includes a sensing unit 56 having an optical sensing axis 58 that forms an angle of 90° in a preferred embodiment with the work station reference plane 46 when the hand 22 is oriented during sensing. As shown in FIG. 2, the sensing axis 58 forms an angle of 45° with respect to the hand axis 54.

The sensing unit 56 includes an objective lens 60 having an optical axis aligned with the optical sensing axis 58. The sensing unit 56 also includes a fiber optic bundle or cable 62 that is arranged to receive reflected light from the objective lens 60 along the sensing axis 58. The fiber optic bundle or cable 62 is connected to the camera 32. The sensing unit is enclosed by a suitable housing 64 to reduce unwanted, stray light from being sensed that is not aligned with the optical sensing axis 58.

The sensing hand 22 also includes a mounting support frame 66 for suitably supporting, interconnecting and orientating the sensing unit 56 and the projection unit 50 on the sensing hand 22. The sensing hand 22 also includes a stud 68 extending along the hand axis 54 for interconnection to the manipulator arm 18. A tapered alignment bore 70 is provided in the stud 68 extending along the hand axis 54 for interconnection with the manipulator arm 18. An alignment bore 70 is provided in the stud 68 for registration with the manipulator arm 18. Extending from the sensing hand 22 opposite the stud 68 is a tongue 72. Referring additionally to FIG. 3, the tongue 72 interfits with the sensing hand fixture 40 and includes a circular cross section receiving passage 74.

The sensing hand retaining fixture 40 at the hand holder station 26 includes an upstanding fixture block 76 affixed atop the fixture reference plate 44. The fixture block 76 is provided with a receiving channel 77 for receiving the tongue 72 of the hand 22. The sensing hand retaining fixture also includes a tapered retaining or latch pin 78 movable within the channel 77 along an axis 80 and operated by an air cylinder actuator 82.

The retaining pin 78 is movable between a first extended hand retaining position and a second withdrawn hand release position. With the retaining pin 78 withdrawn from the channel 77 to the hand release position, the sensing hand 22 is positionable within the fixture 40 by means of the tongue 72 being received within the channel 77. The retaining pin 78 is then moved to the hand retaining position by operation of the air cylinder actuator 82 with the retaining pin 78 extending through the passage 74 of the tongue 72.

Thus, the sensing hand 22 is retained or latched by the sensing hand fixture 40 in a predetermined position and orientation. The air cylinder actuator 82 is opertaed via air lines 84, 86 by an electricity operated solenoid valve 88. The solenoid valve 88 is connected to an air supply at 90 and is operated over electrical conductors 91.

Turning now to a consideration of the welding hand 24, the welding hand 24 includes a welding torch 92 extending from the generally cube shaped hand body member 92 at an angle of 90° in a preferred embodiment from a welding hand axis 94. The welding hand 24 also includes a stud 96 extending along the welding hand axis 94 for interconnection to the manipulator arm 18. The stud 96 is provided with a tapered alignment bore 98 for registration with the manipulator arm 18.

The welding hand retaining fixture 42 includes an upstanding wall member 100 extending from the fixture reference plate 44. The wall member 100 and a movable clamp member 102 provide a proper predetermined orientation of the welding hand 24 within the fixture 42. The movable clamp member 102 is controllable between two positions along a clamp axis 104 to retain or clamp the welding hand 24. The welding hand body member 93 includes a tapered bore 105 that is arranged to interfit with a tapered portion 107 of the clamp member 102.

The movable clamp member 102 is connected to an operating arm 106. The operating arm 106 is movable upon the actuation of an air cylinder actuator 108. The air cylinder actuator 108 is operated via air lines 110, 112 by an electrically operated solenoid valve 114. The solenoid valve 114 is connected to an air supply at 116 and is operated over electrical conductors 118.

As discued hereinbefore, the manipulator arm 18 includes a manipulator hand or wrist 21 at the outermost end of the manipulator arm 18 for selective attachment of the sensing hand 22 and the welding hand 24, one hand at a time. In the specific arrangement illustrated in FIG. 2, the wrist 21 includes a hand recieving socket 20 with circumferentially arranged clamp members 124. The clamp members 124 are operable between an outer circumferential position and an inner circumferential position for respectively releasing or clamping the hands 22, 24 respectively. The receiving socket 20 and the clamp members 124 are arranged to interfit with the studs 68 and 96 of the hands 22, 24. The clamp members 124 in various specific embodiments are either hydraulically, pneumatically or electrically operated between the hand released and hand clamped positions.

The sensing socket 20 further includes an operable registration pin 126 that is tapered to interfit with the bores 70, 98 of the hands 22, 24 to assure proper axial registration of the hands 22, 24 with respect to the axes 54, 94 and circumferential registration with respect to the hand receiving socket 20. The registration pin 126 is controlled by an air cylinder actuator. Further, in an alternate embodiment, the pin 126 is spring biased and registration position of the pin 126 is sensed to assure thar proper registration with and attachment of the hand 22, 24 has been achieved. In another alternate embodiment, the hand receiving socket 20 is provided with a receiving hole ad the registration pin is provided on the hands 22, 24.

Thus, with the manipulator wrist 21 positioned over the stud 68 or 96 of hand 22 or 24 and the clamp member 124 in the hand released position, the stud 68 or 96 is received within the receiving socket 20. The clamp members are moved to the hand clamp position and the hand 22 or 24 is attached to the manipulator arm 18. As used herein, the terms grasped and clamped are used to denote attachment or retention of a hand 22 or 24 by the manipulator arm with a sufficient holding force to allow desired work operations to be performed without movement of the hand 22 or 24 with respect to the sensing socket 20 of the manipulator arm 18.

Accordingly, to exchange hands at the work station 26, the manipulator arm 18 positions the currently retained or attached hand, for example, welding hand 24, in the welding hand retaining fixture 42. The manipulator apparatus 10 then actuates the clamp member 102 via the solenoid valve 114 and the air cylinder actuator 108. Next, the manipulator arm 18 unclamps or releases the welding hand 24.

Further, to attach the sensing hand 22, the manipulator arm 18 positions the receiving socket 20 in the unclamped position over the stud 68 of the sensing hand 22. The manipulator arm then clamps the hand 22 via the clamp members 124 after registration by the pin 126 is achieved. Next, the manipulator apparatus 10 controls the solenoid valve 88 and the air cylinder actuator 82 to release the sensing hand 22 by moving the retention pin 78 to the withdrawn position in non-interferring relationship with the passage 74 of the tongue 72. Thereafter, the manipulator arm 18 moves away from the hand holder station 26 with the attached hand 22.

Referring now additionally to FIG. 4 and considering a preferred embodiment of the projection unit 50 of the sensing hand 22, the projection unit 50 includes a projection source 130 including an elongated light emitting filament 132 that is arranged substantially perpendicular to the projection axis 52. The emitted light from the filament 132 generally referred to at 136 is passed through a projection lens assembly 138 that includes one or more lens elements. A mask 140 is provided after the lens assembly 138 in specific embodiments where the projection source 130 includes a light reflective casing 134. In the situation where no light reflection of the light emitted by the source 130 is present within the housing 65, the mask 140 is not required. Thus, the orientation of the filament 132 in the projection unit 50 provides an efficient method for providing the desired projected slit pattern 27. In accordance with the desired operation of the projection unit 50, it has been found that the projection source 130 may be provided by a 12 V DC auto lamp having relatively low power dissipation to project a suitable optical slit pattern onto a workpiece and to practice the present invention. Thus, the projection unit 50 does not require a mask between the lens assembly 138 and the source 130 as is normally found in optical slit pattern projectors. For illustrative purposes a GE type 211-2 bulb has been found suitable for the source 130.

Considering now an alternate embodiment of the present invention and referring to FIGS. 5 and 6, the manipulator arm 18 of FIG. 1 is provided at wrist portion 21 with a welding and sensing hand arrangement 144 that includes a fixed orientation welding torch 146 and a sensing assembly 148 mounted at 150 for rotation along an arc 152 between an operative sensing position at 154 and an inoperative position 156.

In the operative sensing position 154, the sensing assemby 148 functions as described hereinbefore to provide sensed image data along the weld path. In the inoperative position 156, the sensing assembly 148 is removed from the welding environment and the welding torch 146 performs the welding operation unrestricted by the sensing assembly 148.

While the welding and sensing hand 144 is referred to as a single combinational hand, the arrangement 144 may also be characterized as a multiple hand 144 including a welding torch hand 146 and a sensing hand 148. Thus, in this terminology, the sensing hand 148 is rotatably controlled between the two positions and the welding hand 146 is fixed.

The sensing hand 148 includes a projection unit 50 as described hereinbefore and a sensing unit 56 as described hereinbefore. As described, the sensing unit 56 incudes a fiber optic cable 62 connected remotely to the camera 32.

The sensing hand 148 includes a support arm 158 that carries the projection unit 50 and the sensing unit 56 in proper orientation as discussed hereinbefore for the practice of the present invention. The support arm 158 is rotatably mounted at 150 on the hand housing 160 by bearings 163. A rotatable shaft 164 extends through the bearings 163 and is fixedly attached to the support arm 158.

The rotatable shaft 164 is driven by a coupled pinion 166. The pinion 166 is rotated and driven by a rack 168. The rack 168 is dirven by an air actuator 170. The air actuator 170 includes air pipes or conduits 172, 174 for actuatiuon of the rack 168. The rack 168 is carried on an actuator 176. The air actuator 170, for example, includes an air cylinder 177 operated by a solenoid 179 to move the actuator 176.

The manipulator apparatus 10 appropriately controls air pressure in the conduits 172, 174 to rotate the sensing hand 148 between the operative sensing portion 154 and the inoperative position 156 for welding and teaching the weld path.

Thus, during the first sensing pass, the manipulator apparatus positions the sensing hand 148 in the operative position 154 to sense the weld path as the manipulator arm 18 moves along the taught path. During welding or teaching, the sensing hand 148 is positioned to the inoperative position 156.

In the inoperative position 156, the air actuator 170 maintains the sensing hand 148 in the position 156. When the sensing hand 148 is lowered to the operative position 154, the supporting arm 158 abuts a stop 162 for proper positioning and registration of the sensing hand 148. The stop 162 is attached to the welding hand 146. In a specific embodiment, the stop 162 is fabricated from rubber or a synthetic elastomeric material.

Thus, with the multiple welding and sensing hand arrangement 144 of FIGS. 5 and 6, the manipulator apparatus 10 during programmed operation merely rotates the sensing hand 148 between the positions 154 and 156 instead of interchanging the sensing hand 22 and the welding hand 24 at the hand holder station 26 as discussed hereinbefore in connection with the two hand arrangement of FIGS. 1 and 2.

The two hand arrangement of FIGS. 1 and 2 may be utilized with a plurality of manipulator arms 18 by providing a hand holder station centrally of four manipulator arms 18 for example. In this arrangement, for welding hands 24, A, B, C and D are provided at a hand holder station. The hand holder station includes a welding hand retention fixture 42 for each of the respective welding hands 24. Further, a single sensing hand 22 with an associated sensing hand retaining fixture is provided at the hand holder station. Thus, the four manipulator arm 18 share the single sensing hand 22.

This arrangement is both efficient and practical since the first sensing pass is accomplished at a much higher rate of speed in accordance with the present invention as compared to the relatively slower welding speed. In a specific embodiment, the manipulator arm 18 may be programmed such that the sensing passes performed by the four manipulator arm 18 are each staggered in time, one from the other. Of course, it should be understood that while four manipulator arm 18 are discussed, a fewer or greater number of arms 18 may be provided to share a single sensing hand.

Considering the first sensing pass and the second welding pass, in an illustrative work cycle, the welding speed is 10 mm per second and the sensing speed is 500 mm/second. Thus for a representative welding path of 100 mm, the first sensing pass requires only 0.2 seconds while the welding pass requires 10 seconds.

In accordance with a preferred embodiment of the present invention, the manipulator apparatus 10 utilizes a remotely located camera 32 that is characterized as a fast scan camera utilizing a photodiode array. For example, one type of fast scan camera 32 that is suitable for the practice of the present invention is a RETICON type MC520 camera available from the Reticon Company of California. With a fast scan camera 32, a suitable image can be obtained in two scans of 2-3 milliseconds each with the first scan being utilized to clear the cells and a second scan for storing a charge representing the image. The fast scans are possible with an apprprite camera since the image pixels are detected as either black or white with respect to a predetermined threshhold as discussed in more detail in the aforementioned application Ser. No. 239,621. Of course, if various intensities were to be detected (shades of gray), a longer scan time would be required.

Referring to the programmed operation of the manipulator apparatus 10 in the first sensing pass as discussed in the aforementioned U.S. Pat. No. 4,380,696 and illustrated by the flow diagram of FIG. 6 in that patent, the remotely located fast scan camera 32 of the present invention provides for more efficient first sensing pass operation. For example, during the first sensing pass, the manipulator arm 18 moves with controlled path movement over the taught path defined by the stored data representing taught points along the path. Specifically, image data is sensed or acquired at a number of points along the path; the sensed image data being acquired at either the taught points or at other predetermined points along the path.

In accordance with important aspects of the present invention, if the camera 32 can obtain a satisfactory image in a short interval, i.e. fast scan rate, the manipulator arm can be programmed to move continuously over the taught path at a relatively high rate of speed without stopping the arm to acquire image data at the predetermined image sensing points. Thus, the manipulator apparatus 10 of the present invention with the fast scan camera 32 is capable of obtaining accurate weld path deviation data "on the fly" while the arm 18 moves continuously over the path. The continuous motion, fast speed sensing pass is provided by the use of a fast scan camera 32. The use of the fast scan camera 32 is made possible in the practice of the present invention by the fiber optic cable 62 on the sensing hand 22 and the remote location of the camera 32. If the camera 32 is mounted, on the sensing hand as discussed in U.S. Pat. No. 4,380,696, the size of the camera 32 is limited due to hand geometry and obstructions in the work environment. Further, the interchange of the hand 22 at the hand holder station 26 is simplified if the camera 32 is located remotely and is not carried on the hand 22.

During the practice of the present invention, an image acquisition time of 2-3 msec. and a sensing speed of 500 mm/second has been found suitable to obtain accurate deviation data between the actual path of the manipulator and the weld path with continuous motion of the manipulator arm during the first sensing pass. This represents an arm movement of approximately 1-1.5 mm. during the image data acquisition time. Another 1 to 1.5 mm of path movement is required to clear the camera 32 for the storage of another image. However, since the weld path is normally sensed at points farther than 3 mm apart, the clear scan time does not represent a limitation on the process. Thus, for the practice of the present invention, the 1-1.5 mm movement of the arm during the image scan acquisition time does not significantly effect the overall image data, the accuracy of the image data, or the accuracy of the deviation data.

Another reason why we could realize a high speed path for sensing is that the positional destinations for the second welding path are calculated from the deviation data and the actual path data of the manipulator during sensing. When the manipulator moves fast, it is impossible to eliminate the positional difference between the taught path and the actual path of the manipulator. Because we used the actual path, but not the taught path, for the calculation, we could increase the path speed without accounting for the positional difference between the taught path and the actual path.

While there has been illustrated and described several embodiments of the present invention, it will be apparent that various changes and modifications thereof will occur to those skilled in the art. For example, various types of vision systems are utilized in various specific embodiments utilizing various forms of electromagnetic wave geneation by the projection unit and complementary sensing-detection devices. It is intended in the appended claims to cover all such changes and modifications as fall within the true spirit and scope of the present invention.

What is claimed as new and desired to be secured by Letters Patent of the United States is:

1. An image sensing arrangement for manipulator welding apparatus comprising:
   sensing means including a projection source and an image sensing unit, the manipulator apparatus including a manipulator arm controllable in a plurality of axes and having a hand at one end of the arm, said sensing means being carried by the hand so as to be movable in said plurality of axes;
   a generally elongated welding torch carried by the hand;
   means for mounting said welding torch to the manipulator arm;
   means for rotatably mounting said sensing means with respect to the hand and said welding torch, the axis of rotation of said sensing means being substantially perpendicular to the longitudinal axis defined by said welding torch; and
   means for selectively rotating said sensing means between an operative sensing position and an inoperative position, said welding torch performing welding with said sensing means in said inoperative position, said welding torch being inoperative with said sensing means in said operative position.

2. The image sensing arrangement of claim 1 wherein said rotatable mounting means and said selective rotating means comprises rack and pinion drive means and air actuator means, said rack and pinion means comprising rack means mounted to move with said hand at said one end of the arm and being driven by said air actuator means, said rack and pinion means further comprising pinion means mounted for movement with said sensing means.

3. The image sensing arrangement of claim 2 wherein said rotatable mounting means further comprises a support arm carrying said sensing means, said support arm including a shaft, said rotatable mounting means further comprising bearing means for rotatably supporting said shaft with respect to the manipulator hand.

4. The image sensing arrangement of claim 1 wherein said welding torch includes a welding tip end, said sensing means in said inoperative position being rotated away from the welding tip end of said welding torch so as to be removed from the welding environment defined by the vicinity of said welding tip end.

5. The image sensing arrangement of claim 1 wherein said rotatable mounting means includes an extending arm carrying said sensing means, said welding torch carrying a fixed stop member, said extending arm in said operative position contacting said stop member to establish a predetermined position for said operative position.

6. The image sensing arrangement of claim 1 wherein said image sensing unit comprises a lens arrangement and fiber optic transmissive means, said image arrangement further comprising a camera located remotely from the manipulator arm and being connected to said fiber optic transmissive means, said fiber optic transmissive means extending from said sensing means to said remotely located camera.

* * * * *